Nov. 19, 1968    M. D. CLARK    3,411,221
WORD GAME DEVICE

Filed July 13, 1965    2 Sheets-Sheet 1

Melford D. Clark
INVENTOR.

BY *Clarence A. O'Brien*
and *Harvey B. Jacobson*
Attorneys

Nov. 19, 1968

M. D. CLARK 3,411,221

WORD GAME DEVICE

Filed July 13, 1965

INVENTOR.
Melford D. Clark
BY Watts & Fisher, attys.

3,411,221
WORD GAME DEVICE
Melford D. Clark, 4068 Ridge Road,
Cleveland, Ohio 44109
Continuation-in-part of application Ser. No. 434,570,
Feb. 23, 1965. This application July 13, 1965, Ser.
No. 477,069
10 Claims. (Cl. 35—9)

ABSTRACT OF THE DISCLOSURE

A word game device in which an article such as a card representing an unknown word contains indicia which when compared with means representing selected known words indicate the number of letters common to the unknown word and the selected known words. Successive comparisons are made with different known words to determine the unknown word.

---

This application is a continuation-in-part of my copending application Ser. No. 434,570, filed Feb. 23, 1965, and entitled Word Game Device.

The present invention generally relates to a game device incorporating sets of cards with which a word game may be played or a puzzle solved.

In the game device of the present invention, which may be played by one or more persons, sets of cards are provided with certain of the cards having a predetermined arrangement of holes therein for representing an unknown word. One of these cards is selected and is placed against a card having a blackened area thereon, representing a known word, for the purpose of determining and indicating how many letters in the unknown word appear in the known word. By using a systematic comparison procedure with various known word cards, the unknown word can be determined. Thus, a highly entertaining and educational type of game device is provided.

A preferred embodiment of the present invention includes the use of twenty-six key words which may be employed to determine over two hundred unknown words. The twenty-six words are presented by twenty-six cards known as "blackout" cards, each of which has a black area thereon. For overlying these cards, a larger number of cards having holes therein designated "game" cards are provided. In the preferred embodiment, each key word and each unknown word consists of six letters. When a game card is successively placed over different blackout cards, a player discovers the number of letters that are common to the unknown word represented by the game card and to each key word represented by the blackout cards. By comparing the key words, i.e., known words, with each other and by considering the number of letters common to those words and the unknown word, the player can logically and positively determine the presence or absence of certain letters in the unknown word represented by the game card. When all letters are determined, they are arranged into the unknown word. This game device enables an interesting game to be played by one or more individuals when playing solitary, or by a number of players playing together.

Briefly, each blackout or known-word card is constructed with letter-indicating indicia, such as black or colored areas, holes, etc. Each game card or unknown-word card is constructed with apertures that represent each letter of the unknown word. The same letter of the alphabet is represented on all cards at a corresponding location, and each different letter is at a different location. Thus, common letters in the words of any two cards, e.g., in a game card and a known-word card, are manifested by an alignment or registry of the respective apertures and indicia of the cards when the cards are superimposed.

A feature of the present invention is the provision of a worksheet of score pad having the known words printed thereon as well as the letters of the alphabet in order to enable the players to record the number of letters in the unknown word appearing in a particular known word so that comparative analysis can be undertaken with the least possible chance of error.

Accordingly, the objects of the present invention are to provide a game device which is not only highly entertaining and educational but also requires a considerable degree of concentration and skill and certainly increases a person's vocabulary and is generally inexpensive to manufacture.

Other features and embodiments of this invention will be readily appreciated as the invention becomes better understood by reference to the following detailed description, when considered in connection with the accompanying drawings in which.

Figure 1:
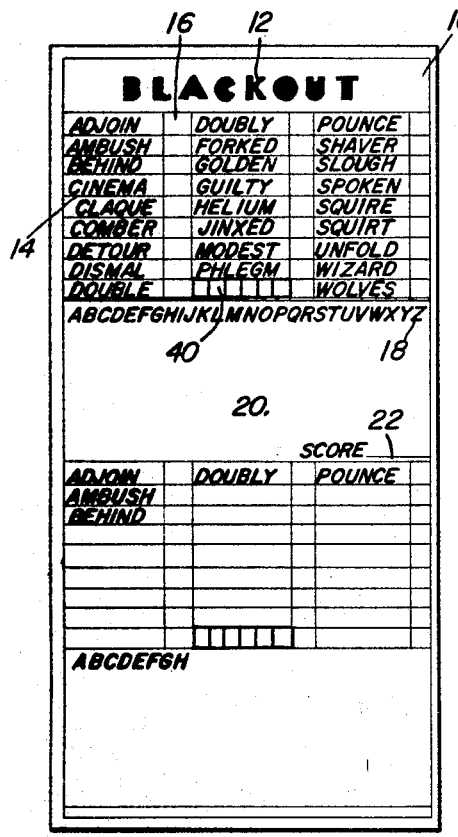
FIGURE 1 is a plan view of a score pad employed in the present invention.

Referring now specifically to FIGURE 1, a score pad or sheet 10 is provided with the name of the game "Blackout" 12 across the top and twenty-six six-letter words 14 are imprinted in columns at the top thereof with a space 16 at the end of each word for writing down certain information defined hereinafter. Each word corresponds to the known word on one of the known-word cards. Below the printed words, alphabetical letters 18 are provided across the top of an open space 20. A score recording line 22 is provided at the bottom right hand corner of the space 20. The printed material appearing on the score pad 10 is duplicated at the bottom thereof and the manner of using the score pad or sheet 10 will become apparent during further discussion of the invention.

Figure 2:
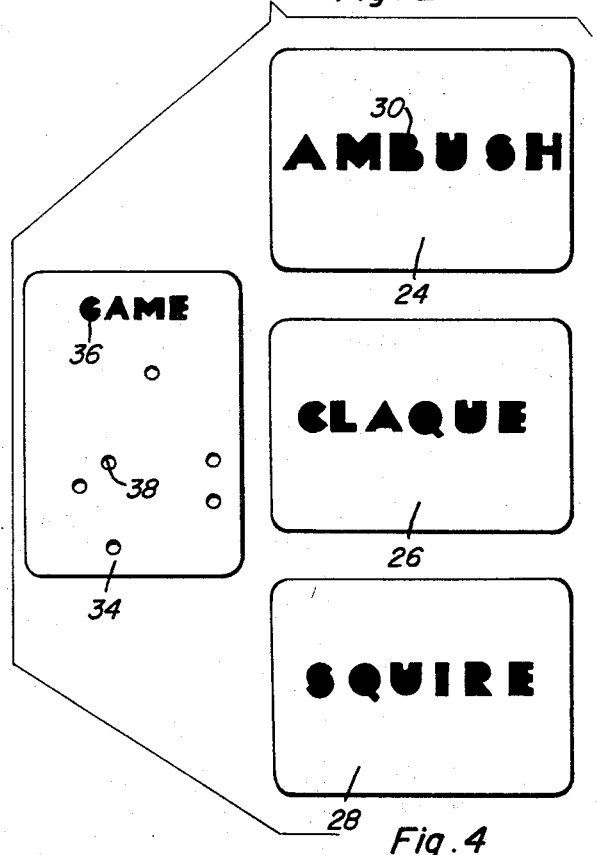
FIGURE 2 is a plan view of a group of representative cards.
Figure 3:
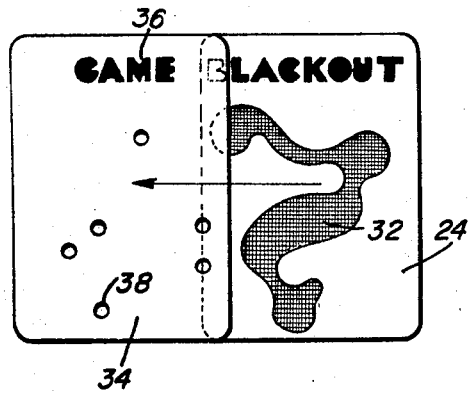
FIGURE 3 illustrates the manner of positioning the cards in overlying relation.

FIGURE 2 represents two types of cards employed in the present invention. The cards 24, 26 and 28, represent "Blackout" cards and each has a different known word 30 printed on one surface thereof and a blackened area 32 imprinted on the other surface thereof along with the name "Blackout." Twenty-six known-word cards are used in the preferred embodiment, although the number may be varied, as may the words themselves. Suitable known words are shown on the score pad of FIGURE 1. The other set of cards employed represents unknown words and are designated by numeral 34. These cards have been designated as "game" cards, with the name of the cards being shown at 36. The cards 34 have a predetermined arrangement of holes or apertures 38 for revealing the blackened area 32 of a known word card through certain of the holes 38 depending upon the shape and configuration of each blackened area and the orientation and arrangement of the holes 38. The number of game cards that may be used depends upon the number of words that can be made from the number of letters used. For example, where the game is constructed using six-letter words, at least 200 words exist and a separate game card may be supplied for each existing word.

Figure 5:
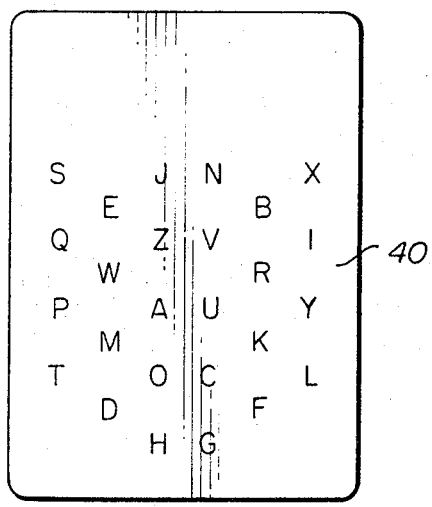
FIGURE 5 is a diagrammatic representation of the cards used in the present invention showing an arrangement of areas or locations on the cards for representing the different letters of the alphabet.

The shape and configuration of each blackened area 32 is determined by fixed, but arbitrarily selected, positions assigned to each letter in the alphabet, as illustrated by the master card 40 in FIGURE 5. This card 40 does not form a part of the game, but may be used in constructing the game and is disclosed here to indicate the manner in which the appropriate locations of the holes and blackened areas of the cards may be determined. While it would suffice to merely blacken individual areas of the known-word cards at the locations corresponding to the letters of the word, a more mysterious pattern, as illustrated by the area 32, conceals the correlation between the letters and their representative location on the cards. Of course, the pattern cannot blacken areas corresponding to letters not contained in the known word.

Similarly, the holes in each game card or unknown-word card are placed in areas corresponding to the letters of the unknown word, in accordance with the positions assigned to the letters of the alphabet, as illustrated in FIGURE 5. It will be apparent, therefore, that letters common to any game card and to any known-word card will be manifested by a superimposition of the holes of the game card with the black area of the known-word card when the two cards are placed one over the other, in proper registry; that is, with their margins aligned and with the top of each card in a corresponding position. Indicia, such as the word "Game" and the word "Blackout," are provided on each card to provide a reference for properly orienting the cards with the top of each in corresponding position and with the proper card surface facing the player, i.e., so that the game card is not inadvertently turned over.

Figure 4:
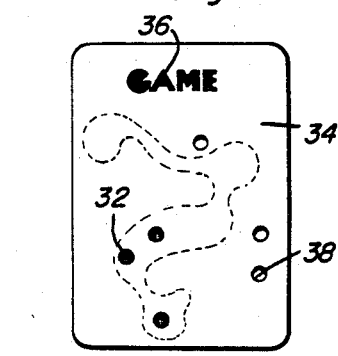
FIGURE 4 is a plan view illustrating the manner of revealing portions of the blackened area of an underlying card through the holes in an overlying card.

In playing a game, the "Game" card 34 is disposed in superimposed relation to one of the "Blackout" cards 24, 26, 28 having a blackened area 32 corresponding to the word 30 on the back of the card, with the word being known. For example, if the card 24 is being used, and the game card 34 is superimposed thereover, as illustrated in FIGURE 4, it will be observed in FIGURE 4 that three letters in the unknown word appear in the word "ambush" depicted by card 24. The player then would write the number three in the blank space 16 alongside of the word "ambush" on the score pad and the card 34 would then be disposed over another "Blackout" card. The player would then record the number of letters appearing in the unknown word alongside of the known word.

In a detailed example, if a "Game" card 34 having the holes 38 therein is placed over the "Blackout" card having the word "doubly" appearing thereon, the card 34 will reveal the blackened area through three holes. From this, it is known that three letters of the unknown word appear in the word "doubly." However, the three particular letters are not known.

Inasmuch as the only difference between the word "double" and "doubly" is the change from the letter "y" to the letter "e," if it is found that when the unknown apertured card 34 is placed over the "Blackout" card for "double," that four of the letters of the unknown word appear in "double" and with the same unknown apertured card three of the letters of the unknown word appear in "double," it is then deduced that the letter "e" is one of the six letters of that unknown word. The letter "y" is not in the unknown word for, if it were, there would have been four blackened holes in the comparison to the "Blackout" card "doubly."

Since it is now known that the letter "e" is in the unknown word, if a comparison to the "Blackout" card "shaver" reveals only one blackened area, this operation would deduce that the letters "s," "h," "a," "v," and "r" are not in the unknown word.

From the foregoing, the player makes the following notes on the pad 10. The letter "e" in the alphabet 18 is encircled and this letter may also be circled in the words 14 where they appear. The letter "e" is also entered in one of the blank spaces 40 on the score pad at the center thereof. The letters "y," "s," "h," "a," "v" and "r" are scratched out or crossed off wherever they appear in the alphabet and in the words 14. This procedure is then continued with other known-word cards until the six unknown letters in the unknown word are determined and these letters are then rearranged to form a word. Initially, it may take ten or more comparisons before a definite conclusion can be reached. However, with practice and concentration, the game may be played and the puzzle solved by determining the unknown word in a lesser number of comparisons. The score line 22 may be employed for indicating the number of comparisons necessary for determining the particular unknown word represented by the game card 34.

The game device of the present invention is adapted for use by a single person in playing solitary in which an arbitrary number of comparisons is selected as a standard for determining a predetermined number of unknown words by comparing the unknown word card 34 with the "Blackout" card corresponding to the list of known words. Additional and more complex unknown word cards may be provided as required and a solution card may be provided for each set of unknown cards. Also score cards may be made available if desired.

Figure 6:
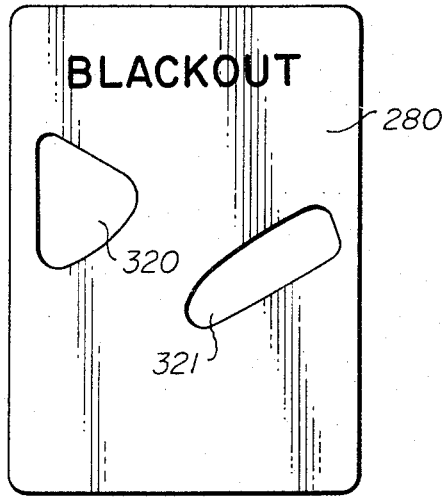
FIGURE 6 is a plan view of another embodiment of a known-word card where the letters of the word are represented by an aperture or apertures in the card rather than by a blackened area.

The foregoing is considered as illustrative only of a preferred embodiment and the principles of the invention, and it will be apparent to those skilled in the art that numerous modifications or alterations may be made without departing from the spirit and scope of the invention, as set forth in the appended claims. For example, as shown in FIGURE 6, known-word cards 280 may be provided with an arrangement of holes, cut out pattern, or transparent areas in predetermined arrangement representing the letters of the known word. Cut out areas 320, 321 are shown by way of example. When a game card 34 is superimposed, a coincidence of letters will be manifested by an alignment of the holes of the game card with the holes, cut out pattern or transparent areas of the known-word card. This will allow light to pass through certain of the holes of the game card, indicating the number of common letters. With this arrangement cards can be constructed to be used with projectors to project upon a screen the known word and the indication of the number of common letters, facilitating group participation.

Various means may be used to indicate a proper orientation of the cards during comparison of a known-word card with an unknown-word card. For example, in addition to or in lieu of the printed indicia for this purpose, already described, an off-center notch may be placed at a given position in one margin of each card. The notches will be aligned when the cards are properly superimposed.

In the preferred embodiment, the known and unknown words are represented by playing cards. Alternatively, it is contemplated that other means may be used to represent the known and unknown words and to indicate the number of letters common to each. For example, the known words may be indicated only on a score pad of the type disclosed. A playmaster or proctor may then announce or display the number of letters common to a selected unknown word and a known word on the score pad selected by the player. For this purpose the proctor may use a master chart that lists the number of letters common to any unknown word and the preselected known words on the score pad with which the game is played. Other variations of this approach for either group or solitary play will be obvious to those skilled in the art. For example, each sheet of the score pad may represent an unknown word and the number of letters common to each of the known words on the pad may be shown, leaving it up to the player to quickly select the most useful information and determine the unknown word. One variant of this would be to conceal and selectively reveal the filled in information disclosing the number of letters common to the unknown word and the known words on the sheet.

While a game using six letter English words has been illustrated by way of example, words with more letters or fewer letters may be used, and the game can be readily adapted to other languages. Also, as used herein, the term color or colored area is meant to include black, grays and white on contrasting backgrounds, as well as chromatic color.

What is claimed is:

1. A word game device comprising a set of cards each card having a known word thereon and a distinguishably colored area thereon representing the known word, a set of cards representing unknown words with each card representing an unknown word having a predetermined arrangement of holes therein, said cards constructed and arranged so that when an unknown-word card is superimposed over the distinguishably colored area of selected known-word cards the distinguishably colored area of the known-word card will be revealed through a predetermined arrangement and number of holes in the unknown-word card, said predetermined number of holes through which the distinguishably colored area is revealed by virtue of the predetermined arrangement corresponding to the number of letters which are common to the known word and unknown word.

2. The device of claim 1 wherein the known words are printed on one side of the cards of the first said set of cards and the colored areas representing the known words are printed on the other side of the said cards.

3. The game device as defined in claim 1 together with a score sheet having the known word printed thereon with a space adjacent each known word in order to enable the number of letters appearing in the known word which also appear in the unknown word to be recorded alongside of the known word on the score sheet, said score sheet also having alphabetical indicia thereon for enabling the letters of the alphabet to be indicated as included or not, or included in the unknown word for determining the unknown word by superimposing the unknown-word card over a minimum number of known-word cards.

4. The game device as defined in claim 1 wherein said distinguishably colored area is of predetermined shape and is flat, all of said cards being of exactly the same size and having indicia thereon indicating the manner of orientation of the cards when superimposed for comparison purposes.

5. A word game device comprising a set of cards each card having a known word thereon and indicia representing the known word, a set of cards representing unknown words with each card representing an unknown word having a predetermined arrangement of holes therein, said sets of cards being so constructed and arranged that when an unknown-word card is superimposed over the indicia of selected known-word cards the indicia of the known-word card will coincide through a predetermined arrangement and number of holes in the unknown-word card, said predetermined number of holes which coincide with the indicia of the known-word card by virtue of the predetermined arrangement corresponding to the number of letters which are common to the known word and unknown word.

6. A word game device comprising a set of cards each card having a known word on one surface thereof and a predetermined arrangement of a hole or holes representing the letters of the known word in that known-word card, a set of cards representing unknown words with each card representing an unknown word having a predetermined arrangement of holes therein, an unknown-word card being superimposed over selected known-word cards, whereby the hole or holes of the known-word card will be coincidental with a predetermined number of holes of the unknown word through which light may pass, said predetermined number of holes corresponding to the number of letters which are common to the known word and unknown word.

7. The game device as defined in claim 4 wherein the predetermined shape of the colored area is irregular.

8. A word game device comprising a first set of cards each card having a known word thereon and indicia, such as a design on a surface of each card which contrasts with other areas of the card surface, which indicia represent by their location the letters of the known word on the card and are present in the same relative location on each card for any given letters of the alphabet, a second set of cards representing unknown words, and apertures in the cards of the second set representing the letters of the unknown word of each card of said second set, said apertures being in the same relative location on each card for any given letter of the alphabet, whereby when a card of the second set is placed over a card of the first set the number of letters common to the known word and the unknown word represented by the two cards are indicated.

9. A word game device comprising a card representing an unknown word, indicia on the card for indicating the number of letters common to the unknown word and selected ones of predetermined known words, and means to be superimposed with said unknown-word card and representative of known words, which means through a predetermined positional relationship established between the indicia of said card and said means when the two are superimposed in a predetermined orientation, makes perceivable the number of letters common to the unknown word represented by the card and a selected known word.

10. A word game device as set forth in claim 9 further including a playing sheet having known words thereon with a space adjacent each known word in order to enable the number of letters appearing in the known word which also appear in the unknown word to be recorded alongside of the known word on the sheet, said sheet also having alphabetical indicia thereon for enabling the letters of the alphabet to be indicated as included or not included in the unknown word for determining the unknown word.

References Cited

UNITED STATES PATENTS

| | | | |
|---|---|---|---|
| 2,652,635 | 9/1953 | Conger | 35—9 |
| 3,245,687 | 4/1966 | Irwin | 273—152.1 |

EUGENE R. CAPOZIO, *Primary Examiner.*

WALTER W. NIELSEN, *Assistant Examiner.*